United States Patent
Austermann

(10) Patent No.: US 8,680,725 B2
(45) Date of Patent: Mar. 25, 2014

(54) ELECTRIC MOTOR

(75) Inventor: Ralf Austermann, Rietberg (DE)

(73) Assignee: Hanning Electro-Werke GmbH & Co. KG, Oerlinghausen (DE)

( * ) Notice: Subject to any disclaimer, the term of this patent is extended or adjusted under 35 U.S.C. 154(b) by 430 days.

(21) Appl. No.: 13/175,861

(22) Filed: Jul. 3, 2011

(65) Prior Publication Data

US 2012/0007578 A1 Jan. 12, 2012

(30) Foreign Application Priority Data

Jul. 6, 2010 (DE) .................. 20 2010 009 961 U

(51) Int. Cl.
*H02K 11/00* (2006.01)

(52) U.S. Cl.
USPC ......................................... 310/68 D; 310/180

(58) Field of Classification Search
USPC .................. 310/68 D, 71, 179–185, 189, 198
See application file for complete search history.

(56) References Cited

U.S. PATENT DOCUMENTS

| | | | | |
|---|---|---|---|---|
| 3,121,832 A * | 2/1964 | Haskell et al. | ........... | 318/400.26 |
| 3,958,173 A * | 5/1976 | Christianson et al. | .......... | 363/64 |
| 3,995,203 A * | 11/1976 | Torok | ............................. | 318/701 |
| 4,258,415 A * | 3/1981 | Torok | ............................... | 363/64 |
| 4,383,213 A * | 5/1983 | Tyrner | ............................. | 322/53 |
| 6,724,099 B2 * | 4/2004 | Klaar | ................................ | 290/52 |
| 2005/0099084 A1* | 5/2005 | Fletcher | ........................ | 310/195 |
| 2009/0021121 A1 | 1/2009 | Christian et al. | | |

FOREIGN PATENT DOCUMENTS

| | | |
|---|---|---|
| DE | 1952069 A | 4/1971 |
| DE | 2937480 A1 | 4/1981 |
| DE | 102005007371 A1 | 8/2006 |

* cited by examiner

*Primary Examiner* — Thanh Lam

(74) *Attorney, Agent, or Firm* — Patent Central LLC; Stephan A. Pendorf

(57) ABSTRACT

An electric motor with an n-pole stator comprising a first stator winding and a second stator winding that can alternatively be supplied with current for the constitution of a pole-changeable electric motor. The supply winding is constituted by at least one turn of the first stator winding or of the second stator winding. Thus, a conventional winding design or coil design of the electric motor can be used to provide a supply voltage for electric equipment. The electric motor features an unchanged compact construction. Only at particular locations of existing stator turns current is tapped, such that a supply voltage of predetermined magnitude can be tapped based on the existing magnetic flux linkage during operation of the electric motor.

10 Claims, 2 Drawing Sheets

ELECTRIC MOTOR

Figure 1:
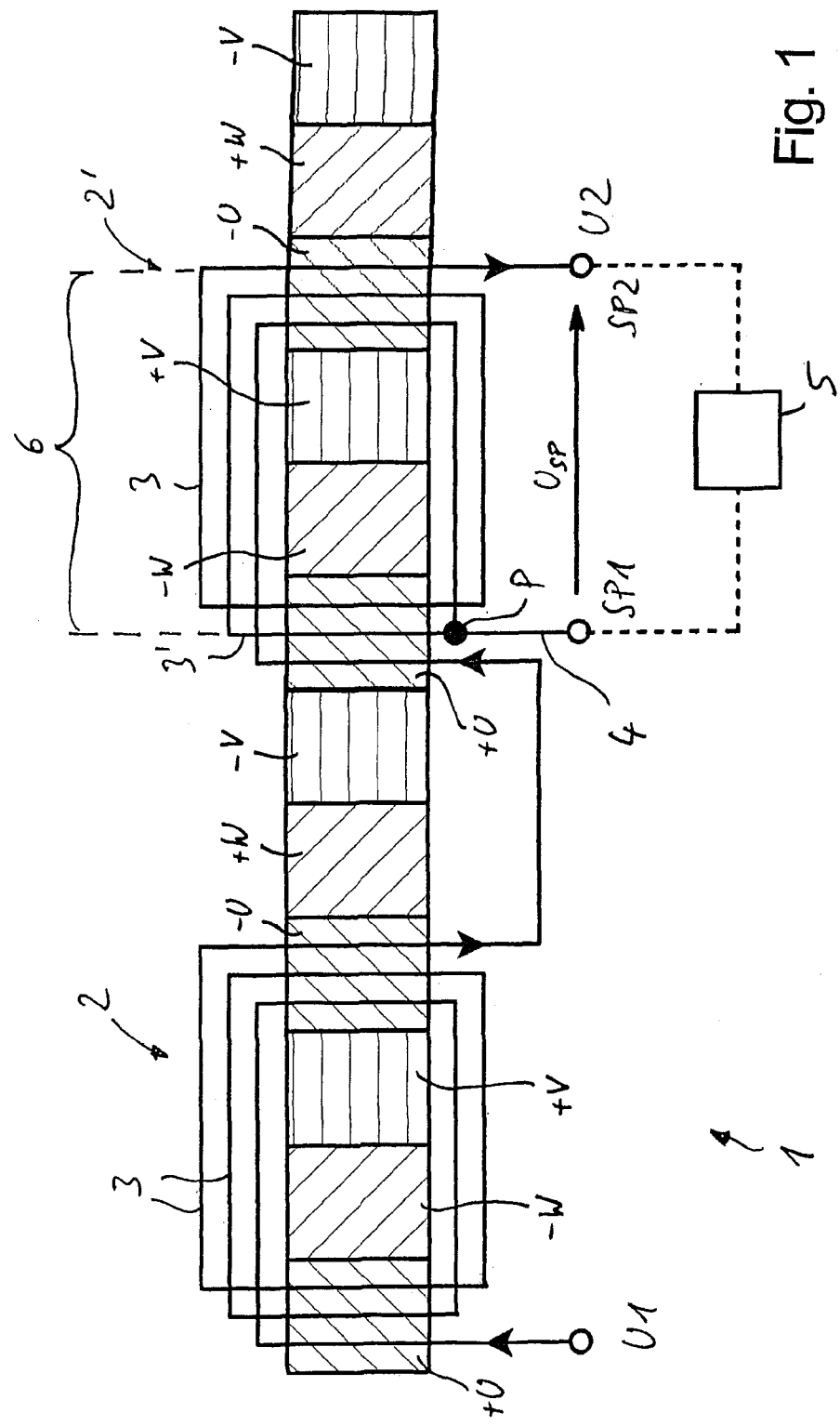

The invention relates to an electric motor with an n-pole stator comprising a number of stator windings that each can be supplied with an electric current through a winding connection, with a rotor allocated to a stator and with at least one supply winding for the generation of a supply voltage for an electric equipment.

From DE 29 37 480 A1 an electric motor with a stator and a rotor is known that features an additional transformer winding as supply winding providing a supply voltage for electric equipment (e.g. electronic controlling equipment). Hereby as an advantage the mains transformer that would be necessary otherwise can be omitted. A disadvantage herein is that the electric motor needs an additional winding.

The objective of the invention is to further develop an electric motor such that with minimized effort a supply voltage can be provided in a pre-determined voltage range particularly for electric equipment, in which the electric equipment is located directly at or near the electric motor.

This objective is accomplished by the invention in connection with the preamble of claim 1, thereby characterized, that a first stator winding and a second stator winding are featured that can alternatively be supplied with current for the constitution of a pole-changeable electric motor, and that the supply winding is constituted by at least one turn of the first stator winding or of the second stator winding.

The specific advantage of the invention is that a conventional winding design or coil design of the electric motor can be used to provide a supply voltage for electric equipment. Thus the electric motor features an unchanged compact construction. Only at particular locations of existing stator turns current is tapped, such that a supply voltage of predetermined magnitude can be tapped based on the existing magnetic flux linkage during operation of the electric motor.

According to another preferred embodiment according to the invention the supply winding of the electric motor is defined by two tap leads the ends of which constitute a supply connection for the supply voltage provided. Depending on the electric equipment to be operated respectively the magnitude of the voltage one or multiple tap leads can be used. With the construction of the stator e.g. multiple tap leads can be provided, such that a user can connect the electric equipment alternatively to different supply connections with different voltage levels.

According to a further embodiment according to the invention the supply winding is constituted by at least one turn of one or multiple coils of the stator winding. The choice of the windings is depending on the magnitude of the supply voltage to be provided.

According to a further embodiment according to the invention the supply connection is located in a terminal box of the electric motor such that the electric equipment can easily be connected.

According to a further embodiment according to the invention the electric equipment connected is a motor related equipment that is to be supplied with electrical current only if the electrical motor is in operating condition (turned on). Thus the function of the electric equipment is linked to the function of the electric motor. The electric equipment for instance can be implemented as a sensor or an electrical monitoring device or as an evaluation device that each functionally act on the operating condition of the electric motor or that transmit its operational parameters to an external control device.

According to a preferred embodiment according to the invention the electric motor is implemented as a pole changeable electric motor with a further second stator winding in which the supply winding is assigned to the first stator winding and/or the second stator winding. For the case that in one operating condition of the electric motor only the second stator winding is connected to an electric supply network while the first stator winding featuring the supply winding is not connected to the electric supply network, the electric equipment can be supplied by means of the supply winding based on the transformer coupling between the second stator winding and the first stator winding. As an advantage the switching of a supply connection for the electric equipment that would be necessary otherwise can be omitted.

According to a further embodiment according to the invention a voltage stabilizing circuit and/or a rectifier circuit is assigned to the supply connection, such that the electric equipment can be supplied with a dc-voltage of pre-determined magnitude.

According to a further embodiment according to the invention such a number of turns and/or local arrangements of turns of coils is used for the supply connection that a pre-determined supply voltage range is produced. As the case may be also multiple equal turns and/or different turns of the coils may be used for different supply connections, i.e. supply connections with different supply voltage levels. For this it is only necessary to bring the according tap leads from the turns of the coils to the outside, which needs to be taken into account during the production of the stator.

Additional advantages of the invention arise out of the further sub claims.

Figure 2:
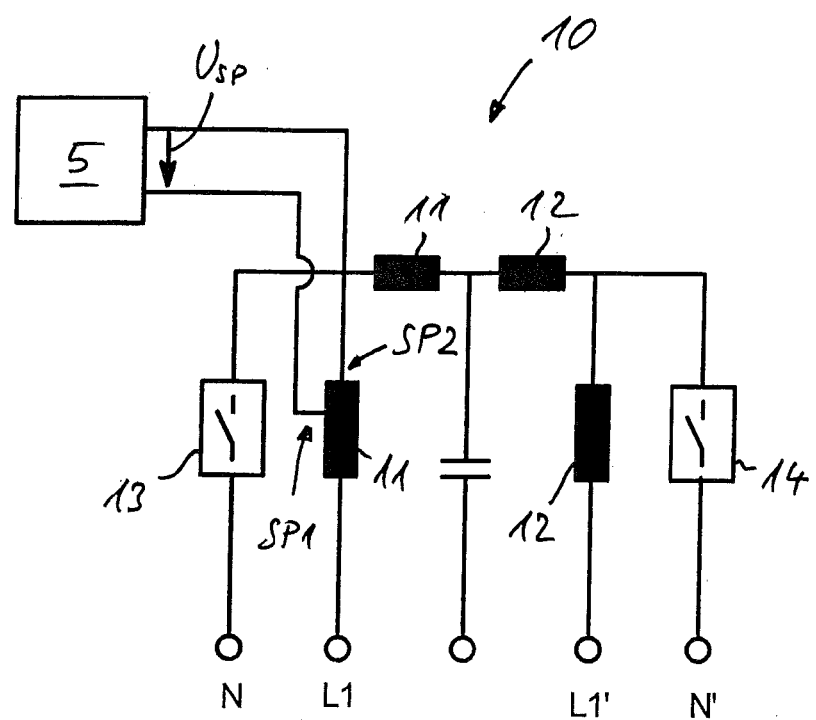

In the following an embodiment of the invention will be explained with reference to the illustrations below. They show:

FIG. 1 a schematic block diagram of a four-pole stator, wherein only one of three winding connections is shown as well as one supply voltage connection and FIG. 2 an equivalent circuit diagram of a stator for a pole changeable electric motor.

An electric motor can be designed e.g. as a pole changeable n-pole asynchronous motor or synchronous motor. It can be designed e.g. as six-pole three-phase current motor. In the embodiment at hand a four-pole three-phase motor is assumed that features a rotor that is not shown as well as a stator 1 with three phase windings U, V, W. Exemplary only the winding of the stator phase U with two coils 2, 2' is shown, in which four coil members +U, −U, of the coil 2, 2' are arranged with a 90° offset to each other in a cylinder shaped stator housing. According to an alternative embodiment according to the invention the electric motor can also be designed as single phase electric motor.

The ends of windings U1, U2 of the first phase U are, at a terminal box not shown here, assigned to a winding connection U1-U1, at which during operating condition of the electric motor a pre-determined electric alternating voltage is present. That voltage may be supplied e.g. by an electrical open or closed loop control device that is not shown here.

According to the invention it is intended that from at least one turn 3 of the at least one coil 2, 2' of the first phase U respectively the other phases V, W a tap lead 4 runs to a connection SP1 respectively SP2, which is preferably also located at the terminal box.

Tapping into such turns 3 is done such that at the supply connection SP1-SP2 a supply voltage $U_{SP}$ is available, which in operating condition of the electric motor supplies a voltage in the range of 2 V to 50 V, preferably 5 V to 15 V. This supply voltage $U_{SP}$ can be used to operate electric equipment 5. In the embodiment at hand the tap lead 4 runs from a connecting point P of a turn 3' of the coil 2' to the supply voltage connection SP1, in which a supply winding 6 is constituted by the turn 3 of coil 2' that runs between the connecting point P and the supply voltage connection SP2.

The electric equipment 5 is designed as a motor related equipment, the function of which is linked to the operation of the electric motor. The motor related equipment 5 can for instance be implemented as a sensor and/ or an electrical monitoring device for the electric motor and/ or as an electrical evaluation device for the electric motor.

For the case the electric motor is an electrical drive for a fan wheel for air circulation in a gas operated combination cooker/steamer, the electric equipment 5 may serve to replace a mechanical centrifugal force switch, which determines the minimum rotational speed to enable the gas supply.

Another embodiment according to the invention not shown here may feature multiple supply connections that provide supply voltages of different magnitude and/or form respectively.

In the embodiment at hand one end U2 of the winding connection U simultaneously also constitutes an end of the coil connection SP2. Hereby the tap lead 4 of the stator package for the formation of the supply winding 6 can be omitted advantageously.

According to another embodiment according to the invention that is not shown here a voltage stabilizing circuit and/or a rectifier circuit can be connected to a supply connection SP1, SP2, with their output constituting the actual supply connections for the electric equipment 5. Hereby a supply voltage $U_{SP}$ that is matched to the electric equipment 5 can be provided advantageously.

Preferably the tapping for the supply voltage connection SP1, SP2 from the turn 3 takes place such that a direct-current voltage respectively an alternating voltage with low ripple is supplied, such that electric equipment 5 operated with direct-current voltage can be connected.

The tap lead 4 is created during the production of the stator 1 respectively the electric motor.

According to another embodiment according to the invention an additional coil may also be included in stator 1 for the purpose of galvanic separation. This is—as the other stator coils—located in the stator housing.

According to another embodiment according to the invention the stator can feature a first stator winding and a second stator winding that can be connected alternatively to an electric supply network to enable the pre-determined operating condition of the electric motor, for example to adjust a pre-determined rotational speed. The first stator winding and the second stator winding are coupled like a transformer, such that always a voltage is induced at the stator winding that is currently not connected to the electric supply network. For the case that the supply winding 6 is located at the "secondary-sided" first stator winding or "secondary-sided" second stator winding, that is not supplied with current from the electric supply network, the electric equipment can be supplied with current. Preferably the supply winding features such a number of turns that the necessary supply voltage for the electric equipment can even be supplied, when the stator winding comprising the supply winding is not connected to the electric supply network.

A further embodiment according to FIG. 2 comprises a pole changeable electric motor with a stator 10, in which by means of switches 13 and 14 alternatively a first stator winding 11 or a second stator winding 12 can be turned on respectively supplied with current. The switch 13, 14 may be actuated by means of an open or closed loop control device that is not shown here, such that in a low rotational speed range of the single phase electric motor only the first stator winding 11 and in a higher rotational speed range only the second stator winding 12 is supplied with current. At the first stator winding 11 a supply voltage $U_{SP}$ is tapped that is used to supply the electric equipment 5. For this the tapping is done with such a number of turns of the first stator winding 11 at a supply connection SP1, SP2, such that a supply voltage $U_{SP}$ that is necessary to operate the electric equipment 5 can be provided. The electric equipment 5 may, as already described in the first embodiment according to the invention, serve as replacement for a mechanical centrifugal force switch, with which the minimum rotational speed enabling the gas supply of a gas operated combination cooker/steamer is determined.

The embodiment according to FIG. 2 differentiates from the embodiment according to FIG. 1 mainly by the use of a single phase electric motor instead of a multi phase electric motor.

As a result of the electro magnetic coupling of the first stator winding 11 to the second stator winding 12, the supply of the electric equipment 5 can also occur when only the second stator winding 12 is supplied with current, while the first stator winding 11 is turned off. It is understood that with a first low rotational speed the switch 13 is in an electric connecting position and the switch 14 in an electric disconnecting position. At a second higher rotational speed the switch 14 is in an electric connecting position while the switch 13 in an electric disconnecting position, such that only the second stator winding 12 is active for the supply of the driving power.

Equal parts respectively construction elements of the embodiments according to the invention are marked with equal reference numerals.

According to an embodiment according to the invention not shown here the supply voltage $U_{SP}$ can also be tapped at the second stator winding 12 instead of the first stator winding 11.

The invention claimed is:

1. An electric motor with a stator comprising a number of stator windings, wherein each can be supplied with an electric current through a winding connection, with a rotor allocated to a stator and with at least one supply winding for the generation of a supply voltage for an electric equipment, wherein a first stator winding (11) and a second stator winding (12) are provided that can alternatively be supplied with current for the constitution of a pole-changeable electric motor, and wherein the supply winding (6) is constituted by at least one turn (3, 3') of the first stator winding (11) or of the second stator winding (12).

2. The electric motor according to claim 1, wherein from the supply winding (6) at least one tap lead (4) is provided for the constitution of a supply connection (SP1, SP2) located in the area of the electric motor, at which the supply voltage ($U_{SP}$) is available.

3. The electric motor according to claim 1, wherein the supply connection (SP1, SP2) is located at a terminal box of the electric motor.

4. The electric motor according to claim 1, wherein at the supply connection (SP1, SP2) as the electric equipment (5) a motor related equipment is connected.

5. The electric motor according to claim 4, wherein the motor related equipment (5) is a sensor and/or an electrical monitoring device and/or an electrical evaluation device.

6. The electric motor according to claim 1, wherein a voltage stabilizing circuit and/or a rectifier circuit is assigned to the supply connection (SP1, SP2).

7. The electric motor according to claim 1, wherein such a number of turns (3,3') of coils (2, 2') are connected to the supply connection (SP1, SP2) that a supply voltage ($U_{sp}$) in the range of 2 V to 50 V is provided.

8. The electric motor according to claim 1, wherein the electric motor is designed multi phased, in which the supply winding (6) is constituted by at least one turn (3,3') of one or several coils (2,2') of the same stator winding (U, V, W).

9. The electric motor according to claim 1, wherein the electric motor is controllable by means of a closed and/or open loop control device.

10. The electric motor according to claim 1, wherein such a number of windings (3, 3') of coils (2,2') are connected to the supply connection (SP1, SP2) that a supply voltage ($U_{sp}$) in the range of 5 V to 15 V is provided.

* * * * *